United States Patent [19]

Easterly, Jr.

[11] Patent Number: 4,464,508
[45] Date of Patent: Aug. 7, 1984

[54] WATER-IN-OIL EMULSIONS OF WATER-SOLUBLE CATIONIC POLYMERS HAVING IMPROVED STABILITY

[75] Inventor: James P. Easterly, Jr., Bay City, Mich.

[73] Assignee: The Dow Chemical Company, Midland, Mich.

[21] Appl. No.: 429,951

[22] Filed: Sep. 30, 1982

[51] Int. Cl.³ ............... C08K 3/14; C08K 3/28; C08K 3/30

[52] U.S. Cl. ................. 524/787; 524/788; 524/801

[58] Field of Search ............ 524/457, 458, 460, 787, 524/788, 801

[56] References Cited

U.S. PATENT DOCUMENTS 4,242,247 12/1980 Pellon et al. .................. 524/801

Primary Examiner—Joseph L. Schofer
Assistant Examiner—J. M. Reddick

[57] ABSTRACT

Water-in-oil emulsions of water-soluble cationic polymers, e.g., a copolymer of acrylamide and acryloylethyl trimethyl ammonium chloride, exhibiting improved emulsion stability are prepared by incorporating a water-soluble salt of a monovalent anion, e.g., ammonium chloride, into the aqueous phase at some point prior to polymerization.

9 Claims, No Drawings

WATER-IN-OIL EMULSIONS OF WATER-SOLUBLE CATIONIC POLYMERS HAVING IMPROVED STABILITY

BACKGROUND OF THE INVENTION

This invention relates to water-in-oil emulsions of water-soluble cationic polymers and to processes for preparing such emulsions.

Various water-soluble polymers such as polyacrylamide and copolymers of acrylamide with other monomers are well-known to be effective flocculants for many substrates including sewage, cellulosic fibers and fines for retention and freeness, metal or treatment, plating waste, coal tailings and the like. Particularly well known for these applications are the cationic carboxamide polymers such as copolymers of acrylamide and various cationic comonomers such as methacryloxyethyltrimethyl ammonium chloride.

In the past, such polymers have been made available commercially as powders or finely divided solids which must be subsequently dissolved in an aqueous medium in order to be used. Because such dissolution steps are sometimes time consuming and often require rather expensive mixing equipment, it has become a common practice to formulate the water-soluble polymer in a water-in-oil emulsion wherein the polymer is dissolved in the dispersed aqueous phase. Such emulsions, as well as a method for preparing them, are described in U.S. Pat. No. 3,284,393 to Vanderhoff et al. Unfortunately for many applications, these emulsions are not as stable and do not invert as readily as desired. In order to accelerate the inversion rate of such emulsions, it has been a common practice, e.g., as shown in U.S. Pat. No. RE 28,474, to add a water-soluble surfactant just prior to inversion. While the addition of an inverting surfactant in this manner does increase the rate of inversion, the resulting emulsions often do not exhibit the desired stability or the activity.

In view of the foregoing deficiencies of conventional emulsions and methods for inverting them, it is highly desirable to provide a stable water-in-oil emulsion that will invert quickly into an aqueous medium.

SUMMARY OF THE INVENTION

The present invention is such an emulsion that comprises (1) a discontinuous aqueous phase containing a water-soluble cationic polymer which aqueous phase is dispersed as colloidal-sized particles or droplets in (2) a continuous oil phase wherein the emulsion contains an emulsion stabilizing amount of a water-soluble salt of a monovalent anion and an emulsifying amount of a water-in-oil emulsifier. In the emulsion of this invention, it is critical that the salt be added at some point prior to polymerization to form the water-soluble cationic polymer, preferably prior to emulsification of the water phase into the oil phase.

In another aspect, the present invention is a method for preparing the aforementioned emulsion which comprises (1) forming a stable water-in-oil emulsion (monomeric precursor) containing at least one water-soluble cationic monomer in the aqueous phase which is dispersed in a continuous oil phase, said emulsion containing a stabilizing amount of a water-soluble salt of a monovalent anion and an emulsifying amount of a water-in-oil emulsifier; and (2) subjecting the monomeric precursor to conditions sufficient to polymerize the monomer. Surprisingly, it is found that, by having the water-soluble salt present in the monomeric precursor prior to polymerization, an emulsion is obtained which is more stable, yet inverts more readily than do emulsions that do not contain the salt. The emulsions of this invention are superior to conventional emulsions in that they form fewer agglomerates (gels) during polymerization than do conventional emulsions. These emulsions are stable in that they can be stored for long periods of time and/or can undergo several freeze-thaw cycles without irreversible coagulation or precipitation. Most surprising is the ability of such emulsions to invert readily into aqueous media.

The emulsions of the present invention are useful as flocculating agents for sewages, industrial wastes, mining streams such as coal slurries and mining effluents, as thickeners for coating formulations and as additives for the manufacture of paper.

DETAILED DESCRIPTION OF THE ILLUSTRATIVE EMBODIMENTS

The present invention is practiced in the preparation of water-in-oil emulsions of any cationic water-soluble polymer. Such emulsions are those wherein the dispersed phase is an aqueous phase having dissolved therein a water-soluble cationic polymer and the continuous oil phase is a water-immiscible inert organic liquid. The ratio of the aqueous phase to the oil phase is suitably any ratio that permits the formation of a water-in-oil emulsion. Preferably, however, based on the total weight of the water-in-oil emulsion, the disperse phase constitutes from about 50 to about 90, more preferably from about 65 to about 80, weight percent of the emulsion. The continuous oil phase preferably constitutes from about 10 to about 50, more preferably from about 20 to about 35, weight percent of the emulsion.

For the purposes of this invention, the water-soluble cationic polymer contained in the aqueous phase of the emulsion is a polymer which forms a thermodynamically stable mixture when combined with water. These mixtures form spontaneously and include true solutions in which the individual polymer molecules are dispersed in water as well as micellular or colloidal solutions wherein the polymer molecules are aggregated to some extent but wherein such aggregates are no larger than colloidal size. Accordingly, the water-soluble cationic polymers are generally homopolymers or copolymers of water-soluble ethylenically unsaturated monomers, at least one of which is cationic.

Suitable water-soluble monomers include those that are sufficiently water-soluble to form at least a 10 weight percent solution when dissolved in water and readily undergo addition polymerization to form polymers that are water-soluble. Exemplary water-soluble cationic monomers include cationic derivatives of ethylenically unsaturated amides such as N-(dimethylaminomethyl)-acrylamide as well as N-(trimethylammoniummethyl)-acrylamide chloride and N-(trimethylammoniumpropyl)-methacrylamide chloride; ethylenically unsaturated quaternary ammonium compounds such as vinylbenzyl trimethyl ammonium chloride, aminoalkyl esters of unsaturated carboxylic acids such as 2-aminoethyl methacrylate and 2-(N,N-dimethylamino)ethyl methacrylate as well as the quaternized derivatives thereof such as acryloylethyl trimethyl ammonium chloride and methacryloylethyl trimethyl ammonium chloride; vinyl amines such as vinyl pyridine and vinyl morpholine and their ammonium salts; diallyl amines and diallyl ammonium compounds such as diallyl dimethyl ammonium chloride; and the like.

Other water-soluble monomers that can be suitably copolymerized with the aforementioned cationic monomers include ethylenically unsaturated carboxamides such as acrylamide and methacrylamide; ethylenically unsaturated carboxylic acids such as acrylic acid and methacrylic acid; N-substituted sulfo derivatives of unsaturated amides such as 2-acrylamido-2-methyl propane sulfonic acid (AMPS); sulfoalkyl esters of unsaturated carboxylic acids such as 2-sulfoethyl methacrylate; as well as the salts of the foregoing monomers.

Of the foregoing water-soluble monomers, the aforementioned ammonium derivatives of acrylate and methacrylate esters and ammonium derivatives of acrylamide and combinations of such ammonium monomers with acrylamide are preferred. Such ammonium monomers and combinations thereof with up to 99 mole percent of other water-soluble monomers such as acrylamide, based on total water-soluble monomer, are more preferred. More preferred are polymers wherein the water-soluble ammonium monomer is methacryloyl ethyl trimethyl ammonium chloride (METAC) or acryloylethyl trimethyl ammonium chloride (AETAC) or a mixture of from about 25 to about 99 mole percent of acrylamide with from about 75 to about 1 mole percent of METAC or AETAC, most preferably a mixture from about 85 to about 95 mole percent of acrylamide and from about 15 to about 5 mole percent of METAC or AETAC.

The molecular weight of the water-soluble cationic polymer is not particularly critical and may vary over a wide range from about 1 to about 25 million. Preferred polymers have a weight average molecular weight in the range from about 2 to about 10 million.

The water-immiscible oil phase of the emulsion generally comprises at least one inert hydrophobic liquid. Usually such liquid is an organic liquid such as a liquid hydrocarbon or substituted hydrocarbon. Preferred organic liquids are the halogenated hydrocarbons such as perchloroethylene, methylene chloride and the like as well as liquid hydrocarbon having from 4 to 15 carbons per molecule including aromatic and aliphatic hydrocarbons and mixtures thereof, e.g., benzene, xylene, toluene, mineral oils, liquid paraffins such as kerosene, naptha and the like. Of the foregoing organic liquids, the hydrocarbons are the more preferred, with aliphatic hydrocarbons being most preferred.

In general, the water-in-oil emulsions of the present invention are prepared by following the general procedure described in the prior art as exemplified in U.S. Pat. Nos. 3,284,393; 3,624,019 and 3,734,873, which are hereby incorporated by reference. In such methods, an aqueous solution of water-soluble, ethylenically unsaturated monomer(s) including the cationic monomer(s) is dispersed in the inert hydrophobic organic liquid containing a sufficient amount of a water-in-oil emulsifying agent to form a water-in-oil emulsion of the water-soluble monomers (monomeric precursor).

Emulsifiers suitably employed for purposes of emulsifying the aqueous phase containing the water-soluble monomer in the organic liquid are those emulsifiers that promote the formation and stabilization of water-in-oil emulsions. Normally such emulsifiers have a hydrophilic-lipophilic balance (HLB) in the range from about 2 to about 9, most preferably from about 3 to 6. Preferably, the emulsifying agent is sorbitan monooleate or the reaction product of oleic acid with isopropanolamide or a mixture thereof. Other suitable emulsifying agents include hexadecyl sodium phthalate, decyl sodium phthalate, octadecyl sodium phthalate, fatty acid glycerides, sorbitan stearate, glycerine mono- or distearate and combinations of such emulsifying agents. Generally, the emulsifier is used in amounts sufficient to provide the desired water-in-oil emulsion. This amount is normally in the range from about 0.1 to about 20, preferably from about 4 to about 6, weight percent based on the weight of monomer.

At some point prior to or during the polymerization of such monomer(s) and preferably prior to emulsification of the aqueous phase containing such monomer(s), a water-soluble salt of a monovalent anion is incorporated in an amount that is sufficient to increase the stability of the resulting emulsion subsequent to polymerization. The salt is preferably incorporated into the emulsion by dissolving it in the aqueous phase containing the monomer prior to emulsification. Alternatively, the salt may be added to the monomeric precursor emulsion just prior to polymerization. For the purposes of this invention, the stability of the emulsion relates to (1) the low level of agglomerates (gel) that are formed during polymerization as well as to (2) the more uniform distribution of the disperse aqueous phase in the continuous oil phase. The increase in emulsion stability resulting from the addition of the salt is normally determined by comparing the quantity of agglomerated polymer (gels) existing in a salted emulsion with the quantity of gels existing in a nonsalted emulsion after polymerization. Preferably, the salted emulsions of the present invention exhibit fewer gels than are formed in comparable nonsalted emulsions. Preferably, the salt is added in an amount in the range from about 2 to about 30, most preferably from about 5 to about 15, weight percent based on the weight of total monomer(s).

Examples of suitable salts include (1) water-soluble inorganic salts of monovalent anions such as the halides, nitrates and the like of the alkali metals and alkaline metals, e.g., sodium chloride, potassium chloride, potassium bromide, calcium chloride, sodium nitrate, and the like; water-soluble ammonium salts of such monovalent anions, e.g., ammonium chloride and ammonium nitrate; and metal and ammonium salts of monovalent organic anions such as ammonium acetate, sodium acetate, sodium propionate, sodium benzoate and other organic anions the salts of which do not exhibit substantial surface active character when dissolved in water. For the purposes of this invention, a salt which does exhibit substantial surface active character reduces the surface tension of deionized water to a value less than 50 dynes/centimeter when the salt is dissolved in water to a concentration of 1 weight percent. Preferred salts are the inorganic salts such as sodium chloride, sodium nitrate and ammonium chloride.

Polymerization of the water-in-oil emulsion of the water-soluble monomers is advantageously effected under conventional conditions such as described in U.S. Pat. No. 3,284,393. Normally such polymerization is practiced in the presence of a polymerization initiator capable of generating free-radicals. Preferably, this free-radical initiator is employed in amounts from about 0.01 to about 0.1 weight percent of initiator based on the monomers. Exemplary polymerization initiators include the inorganic persulfates such as potassium persulfate, ammonium persulfate and sodium persulfate; azo catalysts such as azobisisobutyronitrile and dimethylazoisobutyrate; organic peroxygen compounds such as benzyl peroxide, t-butylperoxide, diisopropylbenzene hydroperoxide and t-butyl hydroperoxide. Of these initiators, the organic types such as t-butyl hydroperoxide are preferred. In addition to the aforementioned ingredients, the emulsion polymerization recipe optionally includes chain transfer agents, inverting surfactants, chelating agents, buffers, salts and the like.

These emulsions are readily inverted for use by adding to an aqueous medium containing an inverting surfactant or by incorporating an inverting surfactant into the emulsion and then adding the emulsion to an aqueous medium.

The following examples are given to illustrate the invention and should not be construed as limiting its scope. Unless otherwise indicated, all parts and percentages are by weight.

EXAMPLE 1

A water-in-oil emulsion of a copolymer of acrylamide and methacryloylethyltrimethyl ammonium chloride (METAC) is prepared by dissolving 118 g of acrylamide and 28 g of METAC in 204.3 g of water containing 0.11 g of the pentasodium salt of diethylenetriaminepentaacetic acid and 14.6 g of ammonium chloride (stabilizing salt). This aqueous phase is then dispersed in an oil phase which contains 124.8 g of liquid hydrocarbon and 10.2 g of mono- and diglycerides of fat forming fatty acids (nonionic, HLB=2.8). The resulting emulsion is placed into a liter glass resin kettle equipped with a stirrer, a nitrogen sparger, a thermometer, a water bath and gas exit. The kettle containing the emulsion is sparged with nitrogen for about 1 hour to remove oxygen. The emulsion is then subjected to polymerization conditions as described in U.S. Pat. No. 3,284,393. The resulting copolymer emulsion is filtered through a wire screen having a sieve opening of 152 micrometers to remove gels and the weight of the gels is determined and recorded in Table I.

For purposes of comparison, several additional emulsions are prepared following the foregoing procedure except using different amounts and types of salts as described in Table I. The quantities of gels is similarly measured for each emulsion and the results recorded in Table I.

TABLE I

| Sample No. | Salt Type | Amount[1] | % Gels[2] |
|---|---|---|---|
| 1 | NH$_4$Cl | 10 | 2.8 |
| 2 | NaCl | 10 | 4.3 |
| 3 | NaNO$_3$ | 10 | 4.0 |
| 4 | CaCl$_2$ | 10 | 8.0 |
| C$_1$* | None | 0 | EF |

TABLE I-continued

| Sample No. | Salt Type | Amount[1] | % Gels[2] |
|---|---|---|---|
| A$_1$* | Na$_2$SO$_4$ | 10 | EF |
| A$_2$* | NaH$_2$PO$_4$ | 10 | EF |

*Not an example of the invention.
[1]Amount of salt is expressed as weight percent based on monomer weight.
[2]Percent gel is expressed as weight percent of the material retained on a wire screen based on total emulsion weight. EF indicates emulsion failure due to total gelation.

As evidenced by the data shown in Table I, the use of salts of monovalent anions substantially reduces the level of gels in water-in-oil emulsions of cationic polymers.

What is claimed is:

1. A water-in-oil emulsion comprising (1) a discontinuous aqueous phase containing a water-soluble cationic polymer which aqueous phase is dispersed as colloidal size particles or droplets in (2) a continuous oil phase wherein the emulsion contains an emulsion stabilizing amount of a water-soluble salt of a monovalent anion and an emulsifying amount of a water-in-oil emulsifier, said salt added prior to polymerization to form the water-soluble cationic polymer.

2. The emulsion of claim 1 wherein the salt is an alkali metal or ammonium salt of a monovalent cation.

3. The emulsion of claim 2 wherein the anion is halide or nitrate.

4. The emulsion of claim 3 wherein the salt is ammonium chloride, sodium nitrate or sodium chloride.

5. The emulsion of claim 1 wherein the amount of salt is from about 2 to about 30 weight percent based on total monomer(s) used to form the water-soluble cationic polymer.

6. The emulsion of claim 1 wherein the cationic polymer is a polymer of a quaternary ammonium alkyl ester of an ethylenically unsaturated carboxylic acid.

7. The emulsion of claim 6 wherein the cationic polymer is a copolymer of acrylamide with from about 5 to about 15 mole percent of methacryloylethyl trimethyl ammonium chloride or acryloylethyl trimethyl ammonium chloride.

8. A method for preparing the emulsion of claim 1, 5 or 7 which comprises (1) forming a stable water-in-oil emulsion (monomeric precursor) containing at least one water-soluble cationic monomer in the aqueous phase which is dispersed in a continuous oil phase, said emulsion containing a stabilizing amount of a water-soluble salt of a monovalent anion and an emulsifying amount of a water-in-oil emulsifier; and (2) subjecting the monomeric precursor to conditions sufficient to polymerize the monomer.

9. A method of claim 8 wherein said cationic monomer is N-(trimethylammoniumpropyl)-methacrylamide chloride or diallyl dimethyl ammonium chloride.

* * * * *